United States Patent [19]

Zabele

[11] Patent Number: 5,712,921
[45] Date of Patent: Jan. 27, 1998

[54] AUTOMATED SYSTEM FOR PRINT QUALITY CONTROL

[75] Inventor: George Stephen Zabele, North Reading, Mass.

[73] Assignee: The Analytic Sciences Corporation, Reading, Mass.

[21] Appl. No.: 560,133

[22] Filed: Nov. 17, 1995

Related U.S. Application Data

[63] Continuation of Ser. No. 78,414, Jun. 17, 1993, abandoned.

[51] Int. Cl.$^6$ ............................................. G06K 9/00
[52] U.S. Cl. ................................. 382/112; 382/216
[58] Field of Search .............................. 382/112, 216, 382/215, 309, 256, 296; 371/24; 235/449, 379

[56] References Cited

U.S. PATENT DOCUMENTS

| | | | |
|---|---|---|---|
| 4,131,879 | 12/1978 | Ehrat | 340/146.3 |
| 4,139,779 | 2/1979 | Ehrat | 250/556 |
| 4,143,279 | 3/1979 | Ehrat et al. | 250/556 |
| 4,148,062 | 4/1979 | Kamin | 382/33 |
| 4,311,914 | 1/1982 | Huber | 382/30 |
| 4,429,414 | 1/1984 | Asakawa | 382/30 |
| 4,488,808 | 12/1984 | Kato | 356/73 |
| 4,862,512 | 8/1989 | Hidaka et al. | 382/58 |
| 5,058,175 | 10/1991 | Aso | 382/34 |
| 5,078,666 | 1/1992 | Porret et al. | 493/1 |
| 5,125,037 | 6/1992 | Lehtonen et al. | 382/8 |
| 5,159,646 | 10/1992 | Kumagai | 382/34 |
| 5,235,652 | 8/1993 | Nally | 382/57 |

FOREIGN PATENT DOCUMENTS

| | | | |
|---|---|---|---|
| 0104477 | 4/1984 | European Pat. Off. | G06F 15/20 |
| 0165734 | 12/1985 | European Pat. Off. | G06K 9/62 |
| 0 194 331 | 9/1986 | European Pat. Off. | |
| 0533305 | 3/1993 | European Pat. Off. | H04N 1/00 |
| 2 159 623 | 12/1985 | United Kingdom | |
| 2261341 | 5/1993 | United Kingdom | H04N 3/15 |

OTHER PUBLICATIONS

"Printing Quality Monitoring System for Offset Presses", Leaflet of Mitusbushi Heavy Industries Ltd., HE20–05389, Apr. 1986.

A. Bleau et al, "A New Set of Fast Algorithms for Mathematical Morphology, I. Idempotent Geodesic Transforms", CVGIP: Image Understanding, vol. 56, No. 2, Sep. 1992, pp. 178–209.

A. Bleau et al, "A New Set of Fast Algorithms for Mathematical Morphology, II. Identification of Topographic Features on Grayscale Images", CVGIP: Image Understanding, vol. 56, No. 2, Sep. 1992, pp. 210–229.

Gilbert Strang, "Linear Algebra and Its Applications", 3.1 Inner Products and Transposes, Academic Press, p. 99.

*Primary Examiner*—Yon J. Couso
*Attorney, Agent, or Firm*—Wolf, Greenfield & Sacks, P.C.

[57] ABSTRACT

A system and methods for controlling print quality of a printed product of a printer, which may comprise an image acquisition unit for acquiring an electronic test image of printing on the printed product after printing by the printer, an image processor for comparing the test image of the printing with a prototype image of desired printing and determining a match between the printing on the test image and the printing on the prototype image, and means for generating an alarm representative of a print quality problem when the match between the printing on the test image and the printing on the prototype image does not satisfy a predetermined condition. The printed product is not required to include any reference marks.

16 Claims, 12 Drawing Sheets

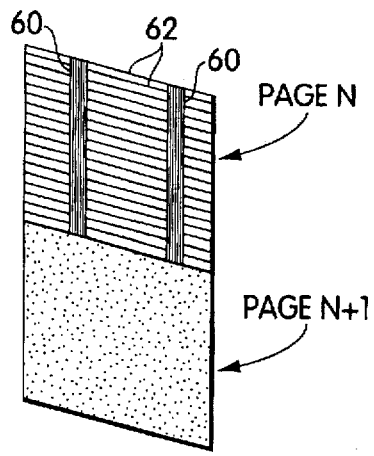
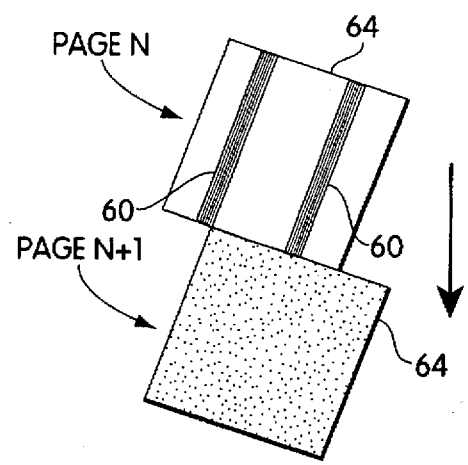
Fig. 5A
Fig. 5B
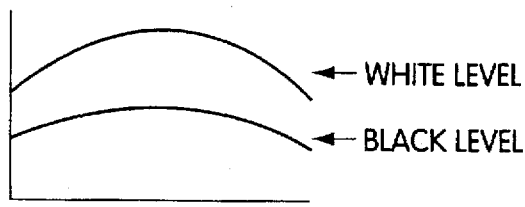
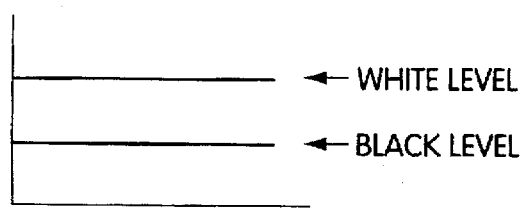
Fig. 6A
Fig. 6B

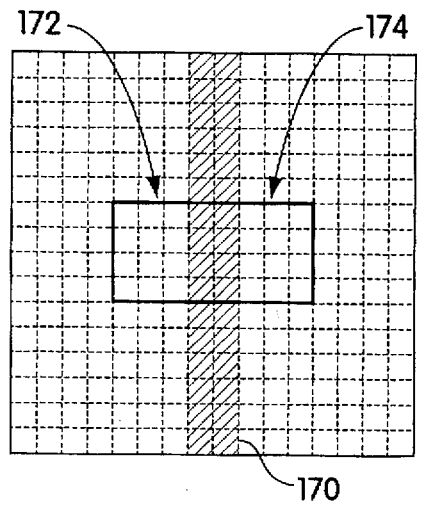
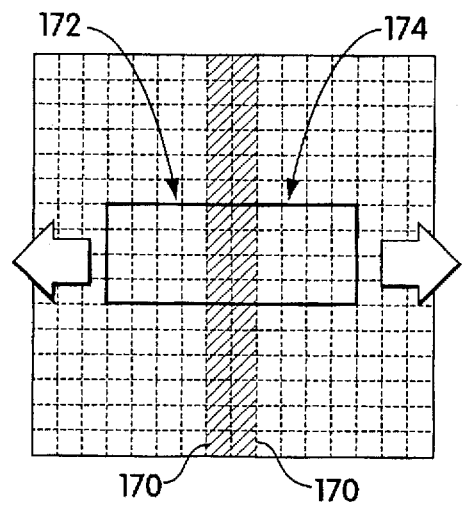
Fig. 14A
Fig. 14B
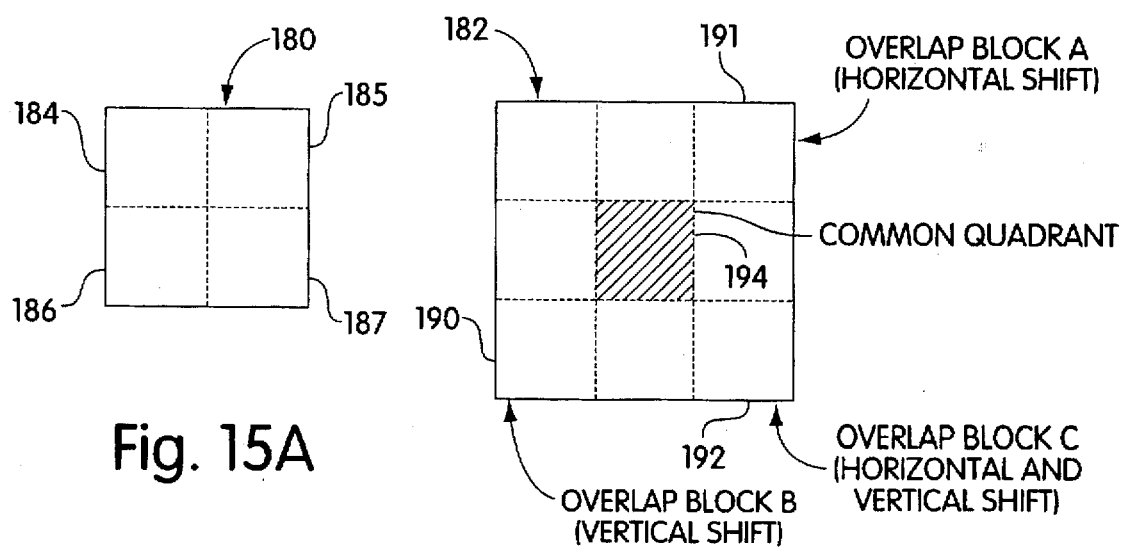
Fig. 15A
Fig. 15B 5,712,921

AUTOMATED SYSTEM FOR PRINT QUALITY CONTROL

This application is a continuation of application Ser. No. 08/078,414, filed Jun. 17, 1993 now abandoned.

FIELD OF THE INVENTION

This invention relates to print quality control and, more particularly, to methods and apparatus for automatically controlling the quality of the printed product of a printer, such as a high speed laser printer, without the use of reference marks on the printed product.

BACKGROUND OF THE INVENTION

The prior art approach to print quality control has typically involved an operator manually inspecting the printed output during or after printing. The inspection typically involves manually riffling through sheet stock or fanfolded continuous stock. This approach is tedious, labor intensive and subject to error.

The introduction of roll-to-roll paper systems with double-sided, very high speed printers provides greatly increased printer throughput. However, manual inspection techniques are not possible with roll-to-roll systems. Since roll-to-roll, high-speed print systems involve a large quantity of print stock (on the order of six miles), it is desirable to provide an automated system for controlling print quality during the printing run.

U.S. Pat. No. 5,078,666, issued Jan. 7, 1992 to Porret et al, discloses a machine for converting printed sheets into packages. The sheets have register marks printed on them. A camera-flash unit operates with an image processing system which contains a reference image. The images from the camera are compared with the reference image to monitor quality.

U.S. Pat. No. 5,125,037, issued Jun. 23, 1992 to Lehtonen et al, discloses a system for controlling the quality of printing, wherein marks are placed on a printed document and a camera is synchronized with the transport speed of the printing process. An image of the area of the paper containing the marks is obtained. The image is used to determine the printing quality.

The prior art technique of placing reference marks on printed documents for controlling print quality has significant disadvantages. The placement of reference marks on the printed product is an inconvenience and an administrative problem in the printing process. In addition, reference marks may not be permitted on certain types of documents. Furthermore, the reference marks do not provide reliable monitoring of print quality, since the reference marks are monitored in one or more small areas of the printed documents. Thus, defects in the actual printing areas may not be detected.

SUMMARY OF THE INVENTION

The present invention provides a system and methods for controlling print quality of a printed product of a printer. The system in accordance with the invention comprises an image acquisition unit for acquiring an electronic test image of printing on the printed product after printing by the printer; an image processor for comparing the test image of the printing with a prototype image of desired printing and determining a match between the printing on the test image and the printing on the prototype image; and means for generating an alarm representative of a print quality problem when the match between the printing on the test image and the printing on the prototype image does not satisfy a predetermined condition. The printed product is not required to include any reference marks.

Two variations are envisioned. A sensing device acquires a test image of the printed information and performs a comparison either with static prototypes acquired during a training phase, or with prototypes acquired dynamically from the interface to the print engine. Static prototypes are acquired by scanning examples of the printed output during an initialization phase before the print evaluation process. Dynamic prototypes are acquired directly from the print engine during print operations and, as such, define the appearance of the printed output on a page-by-page basis. Systems that use static prototypes are less complex and are more appropriate for applications where there is little or no custom information being printed. Systems that use dynamic prototypes are more complex, but can perform quality assessment when there are significant amounts of custom information being printed.

In a first embodiment, a static prototype image can be acquired by the image acquisition unit from printed product known to be free of defects. In this case, the system includes storage means for storing the static prototype image for subsequent comparison with test images of the printed product.

In a second embodiment, the system can include means for acquiring a dynamic prototype image from the printer as the printed product is being printed. The dynamic prototype image is then compared with the test image of the printed product after printing. The quality of variable portions of printed documents can be monitored using dynamic prototype images.

In a preferred embodiment, the image acquisition unit comprises line scanning means, such as a line scan camera, for scanning the printed product as the printed product moves past the image acquisition unit. The line scanning means images a linear region of the printed product oriented perpendicular to the direction of movement of the printed product. The line scanning means is preferably synchronized to movement of the printed product.

The image processor preferably includes means for determining a match between the printing within a block of the test image and the printing within a block of the prototype image. Each of the blocks contains a predetermined number of pixels. The means for determining a match preferably comprises means for performing a pixel by pixel comparison of the blocks of the prototype image with a plurality of equally dimensioned regions of the test image, means responsive to the comparison for determining a match function for each of the regions of the test image and means for identifying a printing defect within the block of the test image when a maximum value of the match function does not exceed an acceptance threshold.

According to another feature of the invention, the image processor further comprises means for generating an exception mask corresponding to the prototype image, the exception mask defining transition regions of the prototype image, and means for ignoring the result of the comparison in the transition regions of the prototype image defined by the exception mask. The exception mask reduces the effect of geometric distortions within the transition regions. In a preferred embodiment, the image processor further includes means for assessing an overall match between the prototype image and the test image by evaluating a total number of pixel errors in multiple blocks of the test image. The image processor can determine a match between the test image and one or more prototype images.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIGS. 5a and 5b are scan path outline diagrams for line scanning and for area scanning;

FIGS. 6a and 6b are plots of output intensity level for white and black pixels against array position before and after correction for the embodiment of FIG. 1;

FIGS. 14a and 14b are diagrams showing a printing error, as detected with adjacent blocks and as missed with match scores optimized; and FIGS. 15a and 15b are diagrams showing a block set and a corresponding expanded block set for a quadrupling of the number of blocks and illustrate overlap in these block sets.

BRIEF DESCRIPTION OF THE PREFERRED EMBODIMENT

Figure 1:
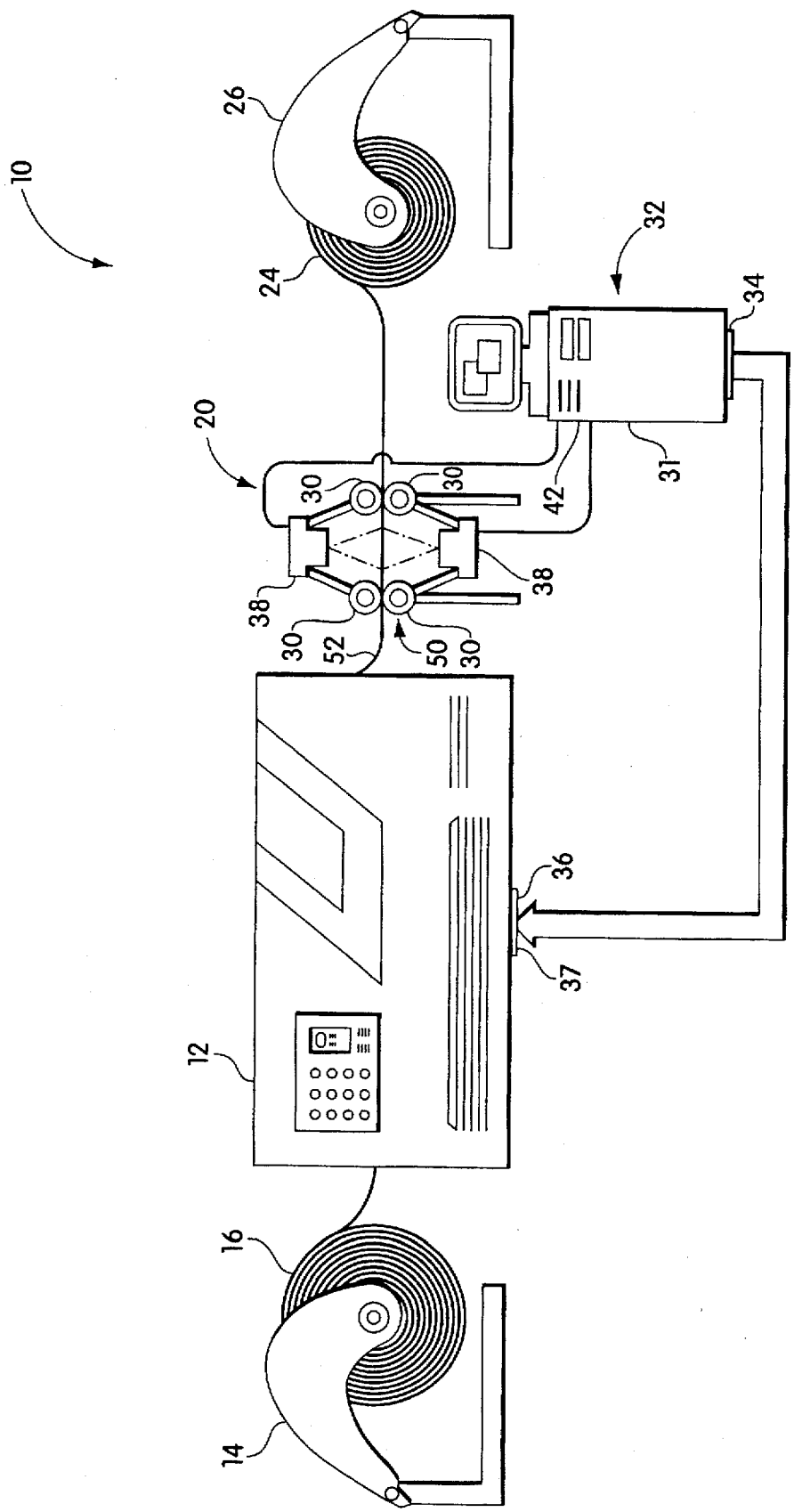
FIG. 1 is a diagrammatic plan view of a first embodiment according to the invention.

Referring to FIG. 1, an exemplary printing system 10 equipped with the print quality control features of the invention includes a printer 12, such as a double-sided, very high speed, volume laser printer. The invention, however, is applicable to other types of printers, such as offset printers or lower speed laser printers. A roll paper dispenser 14 is located adjacent to the printer and holds roll paper 16 as it is fed into the printer. This roll paper may be quite long (e.g., six miles in length). A scanning assembly 20 is located adjacent the printer on its output side. The scanning assembly receives the output print feed 52 from the printer on its way to the take up roll 24, which is supported by a roll product collector 26.

The scanning assembly 20 may include a transport system (or unit) 50 made up of a series of rollers 30, which stabilize the paper, and a pair of scanning elements 38. The scanning elements may be high bandwidth line scanning cameras. The output of these scanning elements is provided to a processing system 32, which may include a 50 MHz 486 IBM-PC. The processing system may also include an output control port 34 for providing a control signal to a printer device interface 36. Such interfaces are common on volume printers. Additionally, if dynamic prototypes are used, the system may also be connected to the printer's video interface 37. The system runs at the nominal transport speed of the printer and requires no start-stop operations for performing print quality check operations so that printer throughout is not diminished. Moreover, the system does not require insertion of additional calibration or measurement marks into the printed information to assist quality assessment processing.

Figure 2:
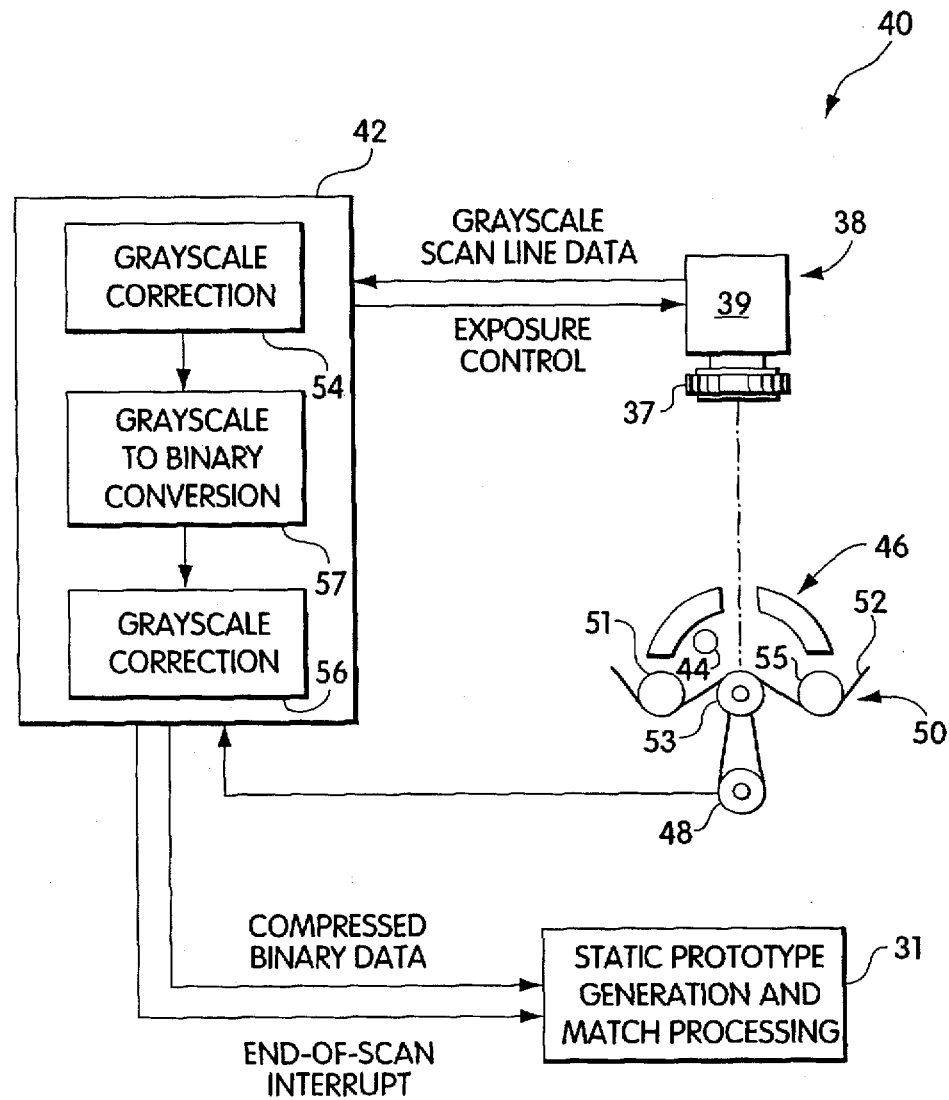
FIG. 2 is a system diagram of the capture system of the embodiment of FIG. 1.

Referring to FIGS. 1 and 2, the print quality control system 40 of the presented exemplary system includes the scanning assembly (or capture system) 20 and the processing system 32 shown in FIG. 1. The electronic capture system may include two scanning elements 38 as shown in FIG. 1, for double-sided printing. Alternatively, it may include a single scanning element as shown in FIG. 2, for single-sided printing. In dual-sided printing applications, it may be preferable to mount the two scanning elements in staggered positions along the paper output feed 52. This will allow for the use of separate center rollers 53, for stabilization reasons discussed below.

Referring to FIG. 2, the scanning element 38 is preferably constructed from a Dalsa CL-C4-2048M line scan CCD camera 39, and a Nikon AF Micro-Nikkor 60 mm f2.8 macro lens 37. The camera is connected to a Vision Modules 3031 camera interface board 42. The camera interface board is inserted into an ISA bus in a 50 MHz Intel 486-based computer running Microsoft DOS 5.0 and Windows 3.1. Continuous illumination is provided with a Mita 21" halogen bulb 44 and reflector assembly 46 in conjunction with a variable voltage supply (not shown) for controlling illumination output. Camera exposure or integration time is controlled through the interface board. Acquisition is triggered by clock pulses from an optical encoder 48 connected to one of the shafts of the paper transport system 50. The optical encoder generates a digital pulse at intervals corresponding to the desired resolution of the capture system.

Referring to FIGS. 5a and 5b, a line scan camera is preferably used instead of an area scan camera, as the artifacts resulting from scanning lines 62 in the presence of geometrical variations are more easily accommodated than artifacts resulting from scanning regions 64 in a continuous imaging system. With a line scan camera, rotation of the camera due to initial or vibration induced misalignment, or alternately rotation of the print stock due to uneven movement by the transport system skews the columns 60 to induce a column skewing artifact as shown in FIG. 5(a). With an area scan camera, the artifact is instead a rotation of the image as shown in FIG. 5(b). As smooth transitions between imaged regions are imperative for match processing, reconciling the boundaries of images produced by area scan cameras generally requires substantial amounts of processing and introduces a potential point of failure. In contrast, the line scan camera does not generate boundary mismatches and no additional processing is required.

Any potential blurring due to paper movement while the camera is integrating is mostly eliminated by using an integration time that is roughly 10% or less of the nominal delay between adjacent scan lines. The delay between adjacent scan lines is obtained by dividing the nominal paper transport speed by the desired imaging resolution. For example, a Siemens 2090 printer has a nominal transport speed of approximately 14 inches per second. For a resolution of 240 dots per inch, the delay between adjacent lines is approximately 300 microseconds, such that a camera integration time of 30 microseconds is preferably used.

Referring again to FIG. 2, the use of a line scan camera makes the use of a flash or strobe unit likely to be expensive and difficult due to the prescribed 300 microsecond cycle time. A readily available and more cost effective preferred solution is the halogen bulb 44 that provides a line-shaped, continuous illumination source. The bulb is oriented across the width of the page, in parallel with the orientation of the line array in the camera 38, and produces a relatively uniform illumination pattern across the page. The reflector assembly 46 is placed between the bulb and the camera to focus the illumination output onto the imaging area as well as to mask the bulb from direct view from the camera.

The bulb 44 is driven with a direct current (DC) voltage source to avoid the oscillations in the illumination that occur when an alternating current (AC) source is used. Oscillations in the illumination give rise to variations in the image that can unnecessarily degrade system performance by decreasing the consistency of acquired images.

Although the halogen bulb yields relatively uniform illumination, other factors such as internal reflections within the transport system, external lighting sources, and the internal construction of the bulb give rise to illumination variations across the imaging area. Uneven illumination is compensated for within the electronic capture system using pixel-dependent offset and gain corrections. During system setup, an all-black target is placed under the camera and the grayscale output level $b_i$ is recorded for each pixel position i in the line scan array. An all-white target is then placed under the imaging system, and the grayscale output level $w_i$ for each pixel position i is recorded. During processing, the grayscale output level $g_i$ for each pixel position i is scaled to produce the illumination source-corrected level $g'_i$ according to the relationship $$g'_i = \frac{(g_i - b_i)}{(w_i - b_i)} k$$

where k is an appropriate normalizing constant.

Referring to FIGS. 2, 6a and 6b, the effect of the corrections is to normalize the output across the line scan array so that white and black areas produce identical output levels across the entire length of the scan array. The actual pixel-dependent offset and gain corrections are performed by a grayscale correction mechanism 54 in the Vision Modules camera interface board before the grayscale data is converted to a binary representation. Conversion from a grayscale representation to a binary representation is also performed within the camera interface board using a thresholding mechanism 57.

The design of the capture system impacts the design of the match processing and assessment approach. The better constrained the system is, the less processing is required. For example, a configuration where individual pixels are uniformly spaced and of uniform width across the acquired image eliminates the need for any position dependent scaling. In a camera-based system, this translates into a flat field-of-view (FOV) requirement. With the Dalsa camera, a FOV with a maximum 10% variation in pixel size is achieved using the Nikon 60 mm macro lens and an approximate stand off distance of 41 inches between the print surface and the principal optics plane.

In order to achieve equal spacing between successive scan lines, a line clock is provided that generates clock pulses at intervals corresponding to the desired vertical resolution of the capture system. The clock is obtained from the optical encoder 48 that is mechanically connected to the print stock transport system 50, such that the actual clock frequency varies proportionately with transport speed. The line clock triggers the image capture cycle through the Vision Modules camera interface board 42 which has been specifically modified to support external triggering for this application. Normally, the capture cycle within this type of interface board is triggered internally by a programmable free-running oscillator.

As the quantity of binary data generated by a capture system running at the nominal speed of the printer can be large, the transfer speed and processing time needed to get data from the camera interface board into the host computer can pose a potential processing bottleneck. Consequently, each scan line is compressed within an interface board run-length encoding mechanism 56 using a run-length encoding technique to minimize the amount of data that must be transferred between the camera interface board and the host.

In operation, the scan line capture cycle begins when a clock pulse from the optical encoder 48 triggers the camera interface board 42. Once triggered, the interface board commands the linear array of sensor elements within the camera 38 to accept charge for the prespecified integration period. At the end of the integration period, the grayscale data are serially clocked out of the linear array into the interface board. As the data are being transferred, the grayscale values are corrected using the prescribed offset and gain correction mechanism 54. The data are then thresholded by the thresholding mechanism 57, and a run-length encoding of the data is performed by the run-length encoding mechanism 56. Once the transfer from the camera to the interface board is complete and the binary data are available, an interrupt signal is generated to the host processor 32. Upon receipt of the interrupt, a host processor interrupt routine retrieves the compressed binary data from the interface board.

The paper transport system 50 is responsible for stabilizing the print stock with respect to the camera 38 and for moving the print through the automatic print quality control system. During transport, the transport system preferably maintains the distance from the camera to the image acquisition area on the stock to within 0.05 inches, and maintains an acquisition area that is flat to within 0.05 inches. These tolerances maintain uniform pixel size during image acquisition. The paper transport system also minimizes lateral movement and rotation, although the constraints are generally less stringent. Here, constraints are relaxed as shift and rotation invariants are incorporated into the match processing and assessment approach.

The print stock is nominally stabilized by passing the stock between a set of three rollers 51, 53, 55. The camera is aligned so that a scan line is acquired from the top of the center roller 53. The diameter of the center roller is large enough so that the 0.05 inch flatness requirement is met for a worst case 1 degree rotation of the camera sensor array relative to the axis of the roller. Preferably, a 1.5 inch center roller diameter is used. Print stock tension against the rollers is maintained by a set of tractor feeds before and after the roller assembly.

While FIG. 2 shows the optical encoder assembly attached to the roller, the encoder is preferably attached to a shaft of one of the tractor feeds. As the tractor feeds lock into the print stock through feed holes on the outside edges of the stock, synchronization of the encoder output with a controlled physical distance (the distance between feed holes is generally 0.5 inches) is assured. If the encoder were not controlled in this manner, for example if the encoder were instead attached to an idler wheel riding on the surface of the print stock, the difference between the distance represented by a long series of clock pulses and the actual physical distance could vary greatly. If the difference between the two distances exceeds the variational range accommodated by the matching procedure, the match process will lose synchronization and the print quality control system will enter a failure mode.

The paper transport system should move print stock at speeds compatible with the printer and any additional post processing devices such as roll take-up units or paper cutters. Speed synchronization can be achieved either by driving the motor in the transport system with a transport clock signal provided by the printer, or by sensing the amount of slack in print stock between the transport system and the printer.

The system 50 is also responsible for turning off the illumination if paper transport is interrupted, and restoring the illumination once paper transport is resumed. Turning off the illumination assures that the print stock is not damaged by the potentially high thermal output of the halogen bulb 44 during stopped periods. When the print stock is moving, the stock velocity is sufficient that any given area is not subject to excessive heating.

The test image acquired for evaluation may be misregistered and distorted relative to the prototype. Even if great care is taken in aligning the system initially, translation, rotation, and scaling effects may be induced during the course of processing by vibration, paper stretching, thermal expansion and other mechanically induced variations. As variations of even half of a pixel can be significant if not handled properly, the match processing method uses adaptive signal processing techniques to achieve reliable performance within the expected range of variations.

The match processing approach of the presented embodiment can be summarized as a scaled, local inner product combined with an exception processing procedure that accommodates mismatches due to geometry induced shape deformation. The scaled local inner product, exception processing, and match assessment methods are described below for bitonal (binary) printing systems. Although the approach readily generalizes to a continuous tone implementation, a large amount of commercial printing machinery performs bitonal printing exclusively, with apparent continuous tone print achieved with binary print through half toning or dithering techniques.

While the magnitude of the distortion across the extent of a page can prohibit matching of a complete prototype page against a complete test page, the distortion mechanisms are in general sufficiently constrained so that distortion effects are either minimal or unobservable locally. For example, consider a 1% increase in page size due to reabsorption of moisture coming out of a high temperature fuser. Across a 17 inch wide page, a 1% increase corresponds to roughly 40 pixels at 240 dpi (dots per inch) and any attempt to perform pixel by pixel matching of an unexpanded image with the expanded image as a single unit should fail. However, over a 16 pixel region a 1% increase is considerably less than 1 pixel, and in general a small, fixed size region from the unexpanded image can be found that will correspond well with an identically sized region from the expanded image.

As a second example, consider the effects of a small angular rotation of the camera relative to the transport direction of the print stock. A 1 degree skewing of a 17 inch wide page corresponds to approximately a 70 pixel vertical shift from one side of the image to the other, whereas a 1 degree shift within a 16 pixel region is less than a single pixel. Again, pixel-by-pixel matching can occur over localized regions, whereas pixel-by-pixel matching of the two images as a whole should not succeed.

The matching approach breaks a prototype image up into blocks, nominally 16 pixels by 16 pixels, and performs a pixel-by-pixel comparison of each block with a number of identically sized regions from a test image. The location of the region within the test image against which a block from the prototype is compared can be constrained so that adjacent blocks within the prototype are matched against nearby, but not necessarily abutting or adjacent regions from the test image.

For a prototype subimage P that is m pixels by n pixels in size, and an equal size subregion from the test image T starting at position (k,l), the normalized inner product C between P and T is given by $$C(k,l) = \frac{\sum_{i=0}^{m-1} \sum_{j=0}^{n-1} P(i,j)T(i+k,j+l)}{\sqrt{\sum_{i=0}^{m-1} \sum_{j=0}^{n-1} P^2(i,j)} \sqrt{\sum_{i=0}^{m-1} \sum_{j=0}^{n-1} T^2(i+k,j+l)}}$$

The normalized inner product is usually referred to as the cosine of the angle between two vectors (see Strang, G. S., *Linear Algebra and Its Applications*, pp. 99, Academic Press, 1976), hence the use of the variable C in the expression. For binary images, each element in P and each element in T takes on one of two values depending on whether the element is black or white. By assigning black a value of −1, and white a value of 1, the two terms in the denominator are both identically the square root of mn such that the normalized inner product reduces to $$C(k,l) = \frac{1}{mn} \sum_{i=0}^{m-1} \sum_{j=0}^{n-1} P(i,j)T(i+k,j+l)$$

With elements of P and T restricted to the set {−1,1}, the result of multiplying an element of P by a element of T should also take on the a value from the set {−1,1}. This relationship can be used to effect an efficient implementation by encoding a black value (−1) as a binary 0, and a white value (1) as a binary 1. For this encoding, a multiplication operation is equivalent to an exclusive NOR operation. An equivalent expression for the normalized inner product is then given in terms of exclusive OR operations by $$C(k,l) = 1 - \frac{2}{mn} \sum_{i=0}^{m-1} \sum_{j=0}^{n-1} D(i,j,k,l)$$

where $$D(i,j,k,l) = P(i,j) \oplus T(i+k,j+l)$$

$$P'(i,j) = \begin{cases} 0 & \text{if } P(i,j) = -1 \\ 1 & \text{otherwise} \end{cases}$$

$$T'(i,j) = \begin{cases} 0 & \text{if } P(i,j) = -1 \\ 1 & \text{otherwise} \end{cases}$$

and the circled plus sign is the exclusive OR operator.

The normalized inner product has the range [−1,1] where a value of −1 corresponds to a perfect inversion or mismatch, and a value of 1 corresponds to a perfect match. Matching functions typically have a value range of [0,1], however, where 0 corresponds to a total mismatch and 1 corresponds to a perfect match. A match function M with the range [0,1] is constructed by scaling the normalized inner product function as $$M(k,l) = \frac{1}{2}(1 + C(k,l))$$

or equivalently $$M(k,l) = 1 - \frac{1}{mn} \sum_{i=0}^{m-1} \sum_{j=0}^{n-1} D(i,j,k,l)$$

The resulting matching method can be interpreted as follows. Perform an exclusive OR of the prototype binary encoded subimage P' with a subregion of the binary encoded test image T' starting at position (k,l) to produce the difference subimage D. Each non-zero entry D(i,j,k,l) in D identifies a difference between the value of the test image at position (i+k,j+l) and the value of the corresponding pixel in the prototype subimage at position (i,j). For a given offset (k,l), the value M(k,l) is then 1 minus the number of differences between the prototype subimage and the test image, divided by the size of the match region. Perfect matches, where the value of each pixel in the translated prototype subimage is the same as the value of the corresponding pixel in the test image, yield the maximum value of one. Perfect mismatches, where the value of each pixel in the translated prototype image is different from the value of the corresponding pixel in the test image, yield the minimum value of zero.

Figure 7:
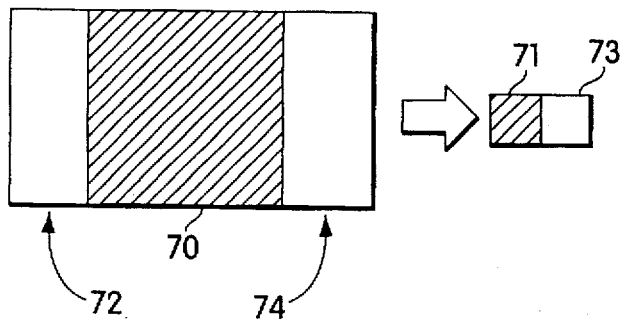
FIG. 7 is a diagrammatic representation of an area to be scanned relative to two sensor elements for the embodiment of FIG. 1, and the resulting interpretation of this area.

Referring to FIG. 7, subtle changes in imaging geometry may result in significant changes in the acquired image. For example, consider imaging a black square 70 that is positioned slightly left of center with respect to two adjacent elements 72, 74 of a binary sensor, where the square is identically the size of a sensor element. Further, assume that the sensor is configured so that if the illumination within an element is greater than 50% of that observed for a completely white area, the element produces a white level; otherwise the element produces a black level. For the described configuration, the left element produces a black pixel 71 and the right element produces a white pixel 73.

Figure 8:
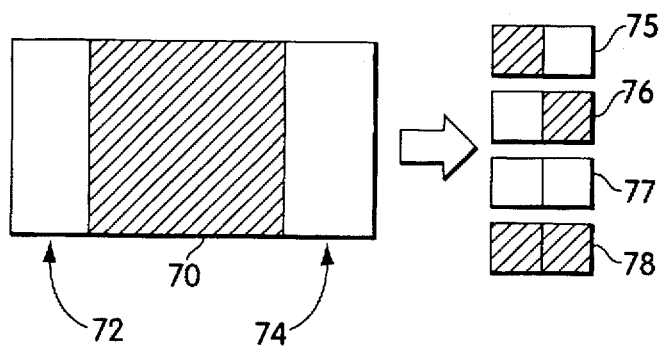
FIG. 8 is a diagrammatic representation of a second area to be scanned relative to the sensors of FIG. 7, showing possible interpretations of this area by the sensors.
Figure 9A:
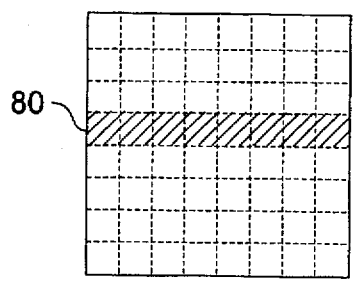
FIGS. 9a–9d are diagrammatic representations of sensed output for an unrotated line, a rotated line, a difference image with no translation, and a difference image with vertical translation, respectively, for an 8 by 8 matrix for the embodiment of FIG. 1.
Figure 9C:
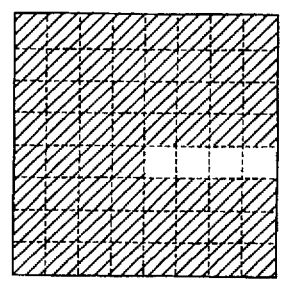
Figure 9B:
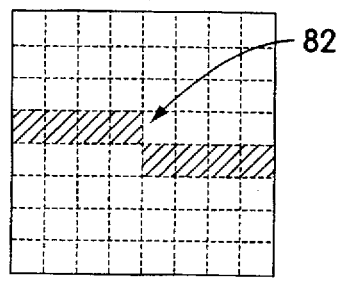
Figure 9D:
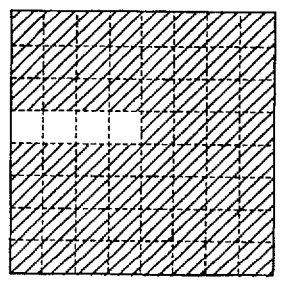

Referring to FIG. 8, if a small right shift of the square 70 relative to the pair of sensor elements 72, 74 occurs, the situation can arise where the illumination observed by each element is exactly 50% of full white. With any amount of noise or variation in sensor sensitivity, any of four outputs can then result. As shown in FIG. 8 the possible output states are: 1) the previously observed black-white pair remains unchanged (75); 2) the black-white pair becomes inverted (76); 3) the black-white pair becomes a white-white pair (77); or 4) the black-white pair becomes a black-black pair (78). For the last two output states, a one-to-one correspondence between the unshifted output and a shifted output is clearly not possible. Furthermore, a one-to-one correspondence may or may not be possible for the second output state, depending on the output values from adjacent elements.

Referring to FIGS. 9a–9d, another example where geometric effects present matching problems occurs when a black line 80 initially aligned with the sensor element grid becomes slightly rotated. The rotation causes the line to shift from grid row to grid row at multiple positions along the grid, yielding a stair step approximation 82 to the previously straight line. The stair step effect introduces matching problems in the vicinity of a step. Although the sensed output for the unrotated line (see FIG. 9c) can be translated vertically to yield partial correspondence with the sensed output for the rotated line (see FIG. 8(d)), perfect correspondence is not achievable.

Figure 10C:
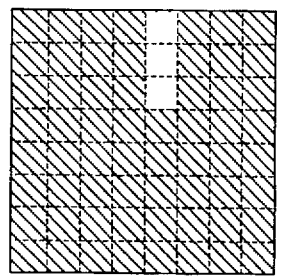
FIGS. 10a–10d are diagrammatic representations of sensed output for an unrotated line, sensed output for a rotated line, a corresponding difference image with best or no translation, sensed output for a misprinted line, and a corresponding difference image with best or no translation, respectively, for an 8 by 8 matrix for the embodiment of FIG. 1.
Figure 10E:
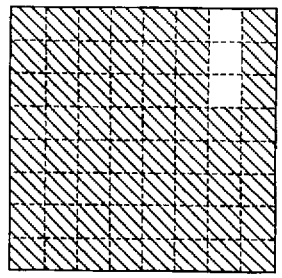
Figure 10B:
Figure 10B:
Figure 10B:
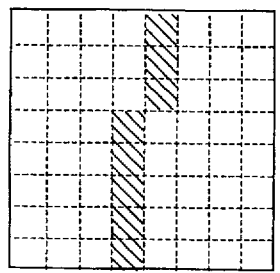
Figure 10D:
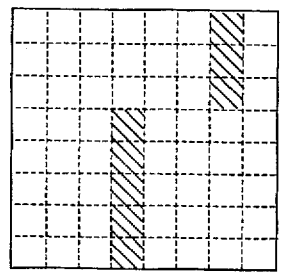
Figure 10A:
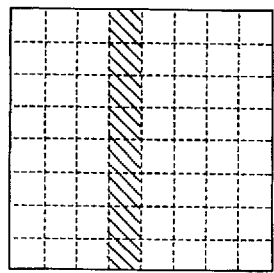

As the underlying information set, i.e. the printed information, in both examples has not changed, the match processing and assessment should indicate that no differences are present. While some immunity to mismatches due to geometry induced variations can be achieved by accepting less than perfect match scores, the equivalent lowering of the acceptance threshold also generally allows defects to pass as acceptable matches. For example, referring to FIGS. 10a–10e, a simple translation-based matching approach combined with a lowered acceptance threshold is unable to discriminate between the geometrically distorted line (see FIG. 10b) and the misprinted line (see FIG. 10d), as the match errors are equal in magnitude.

Figure 11:
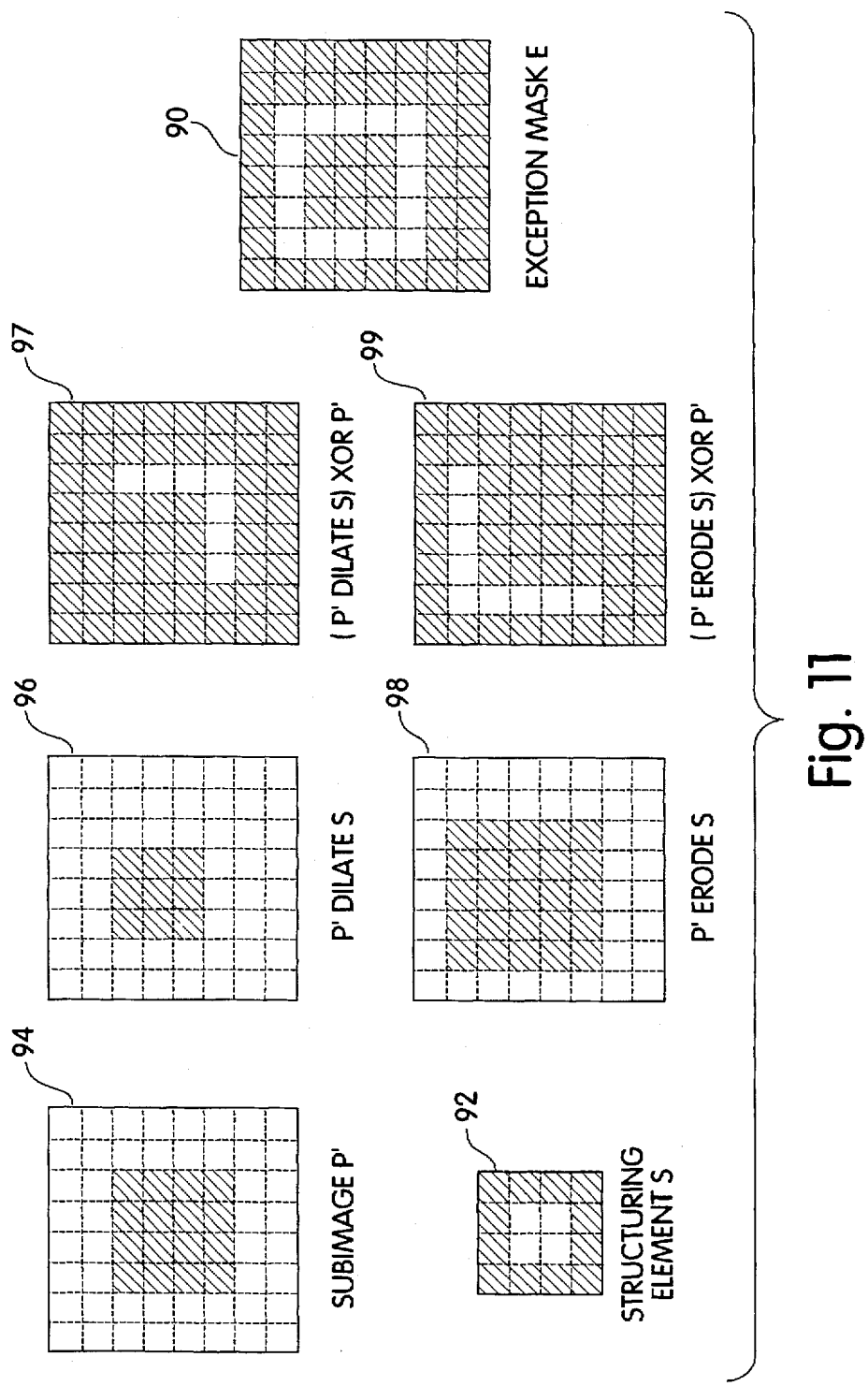
FIG. 11 is an illustrative diagrammatic representation of an exemplary image block and an exemplary structuring element, illustrating operations leading to the production of an exception mask for the embodiment of FIG. 1.

Referring to FIG. 11, a matching procedure is shown that can factor in the position of the errors relative to the structure of the information contained in the prototype, such that errors in the vicinity of white to black transitions do not penalize the match result, can be constructed using exception masks. An exception mask identifies transition regions between white and black regions within a prototype where mismatches can occur due to localized geometric distortions. The prescribed matching procedure is then modified so that match errors occurring within transition areas identified by the mask are allowed as valid matches.

An exception mask is derived from, and is associated with, each prototype. An exception mask is constructed from a prototype using morphological filtering operations (See Bleau, A., et al, "A New Set of Fast Algorithms for Mathematical Morphology", pp. 178–229, CVGIP: Image Understanding, Vol. 56, No. 2, September 1992). For prototype image P, the exception mask E is defined by $$E = \overline{((P\text{dilate}S) \oplus P)} \vee \overline{((P\text{erode }S) \oplus P)}$$

where (P dilate S) is a morphological dilation of P by the structuring element S, and (P erode S) is a morphological erosion of P by the structuring element S. The superbar denotes the logical complement operator, and v denotes the logical or operator.

In practice, S is a small square structuring element 92, typically no larger than three pixels by three pixels in size. The intermediate results 96, 97, 98, 99 leading to an exception mask 90 for a four pixel by four pixel black region 94 surrounded by white, using a two pixel by two pixel structuring element, are shown in FIG. 11.

The exception mask is introduced into the match function M to produce the match function M' used within the print quality control system given by $$M'(k,l) = 1 - \frac{1}{mn} \sum_{i=0}^{m-1} \sum_{j=0}^{n-1} D(i,j,k,l) \wedge E(i,j)$$

where the inverted "V" is the logical AND operator. The logical AND of the difference image and the exception mask effectively sets all mismatches (1's) within the transition regions to 0, indicating matches at those locations.

For each block, the match function M'(k,l) is computed by the processing system for a small range of possible values for k and l, and the maximum value observed within the range becomes the match score for the block. Typically the range is limited to plus or minus two pixel rows (or less) and plus or minus two pixel columns (or less) about the nominal correspondence point for the prototype block position relative to the test image. A block error is declared if the match score for the subimage is below an operator specified block acceptance threshold.

As stray toner or toner drop outs can produce technically degraded but otherwise acceptable quality outputs, an acceptance threshold that allows a small amount of imperfection in the printed output is often desirable. Typically an acceptance threshold of 0.99 provides acceptable performance.

An assessment of the overall match between a prototype and a test image is derived by accumulating match statistics across the set of block scores to form an overall match score. For all blocks for which block errors are declared, the total number of pixels in error within the block is added to an aggregate pixel mismatch value. The total number of pixel errors within a block is computed by subtracting the match score from 1 and multiplying by the size of the block. An overall match score for the prototype against the test image is then computed by dividing the aggregate mismatch value by the sum of the individual block sizes, then subtracting the resulting quantity from 1.

As there can be multiple prototypes, the best overall match score for a prototype against the test image becomes the match score for the test image. If the best overall match score falls below an operator specified soft acceptance threshold, the test image quality is declared questionable and the operator is notified. If the best overall match score falls below an operator specified hard acceptance threshold, the test is declared in error and the printer is halted automatically through the printer interface. The hard and soft thresholds can be set to the same value so that any detected print defects result in printer shutdown. In practice, hard and soft thresholds are set to 0.9999 or greater.

Whenever one or both of the acceptance thresholds are not met, an error image is generated and presented to the operator on the display. The error image is constructed as a logical OR of the difference images associated with the best block match for each block in the prototype with the best overall match score. The best matching prototype image and the test image are also presented to the operator for review. The operator can optionally overlay the error image on top of the test image in contrasting color to identify the location of individual errors within the test image, and formulate corrective action if necessary.

The local matching process operates by moving each prototype block around a localized region of the test image to identify the location of the best fit. Without further modifications, it is possible that print errors will remain undetected. For example, referring to FIGS. 14a and 14b, consider a print error 170 that is a two pixel wide vertical black line in an area that is normally completely white. The error is located within the test image on the border between the nominal positions of two adjacent prototype blocks, 172, 174, as shown in FIG. 14a. As each prototype block contains only white pixels, the match score for each unshifted block is significantly less than 1, indicating the presence of the print error. However, by shifting each block by 1 pixel away from the common boundary, as shown in FIG. 14(b), each prototype block now overlays only white pixels and each match score is identically 1, indicating perfect matches. As the block match assessment algorithm selects the best match score for each block over the corresponding local processing regions, no print errors are detected.

The problem can be circumvented by forcing a covering of the entire test image with prototype blocks. This is achieved by expanding the original set of blocks to include three additional block sets consisting of 1) a set that is shifted by half of a block in the row dimension with respect to the original set, 2) a set of blocks that is shifted by half of a block in the column dimension with respect to the original set, and 3) a set that is shifted by half of a block in both the row and the column dimensions with respect to the original set. If the local region over which each block is shifted during match processing is plus or minus a quarter of a block or less, then at least one block will cover each pixel position in the test image.

Although increasing the number of blocks by a factor of four would appear to quadruple the processing load, a simple decomposition of the match scoring process allows performing the entire additional set of evaluations using only 3 add instructions for each additional block. Referring to FIGS. 15a and 15b, the double summation in the modified match function is decomposed into a set of four double summation terms corresponding to each of four quadrants 184, 185, 186, 187 in the prototype block 180. As the individual quadrants are common to each of four blocks 191, 192, 193, 194 in the expanded block set 182, the result of each quadrant calculation for an original block 184 can be reused for three other blocks. Consequently, computing the match scores for each of the new blocks in the expanded set requires summing the results of four quadrants and requires three adds.

Figure 12:
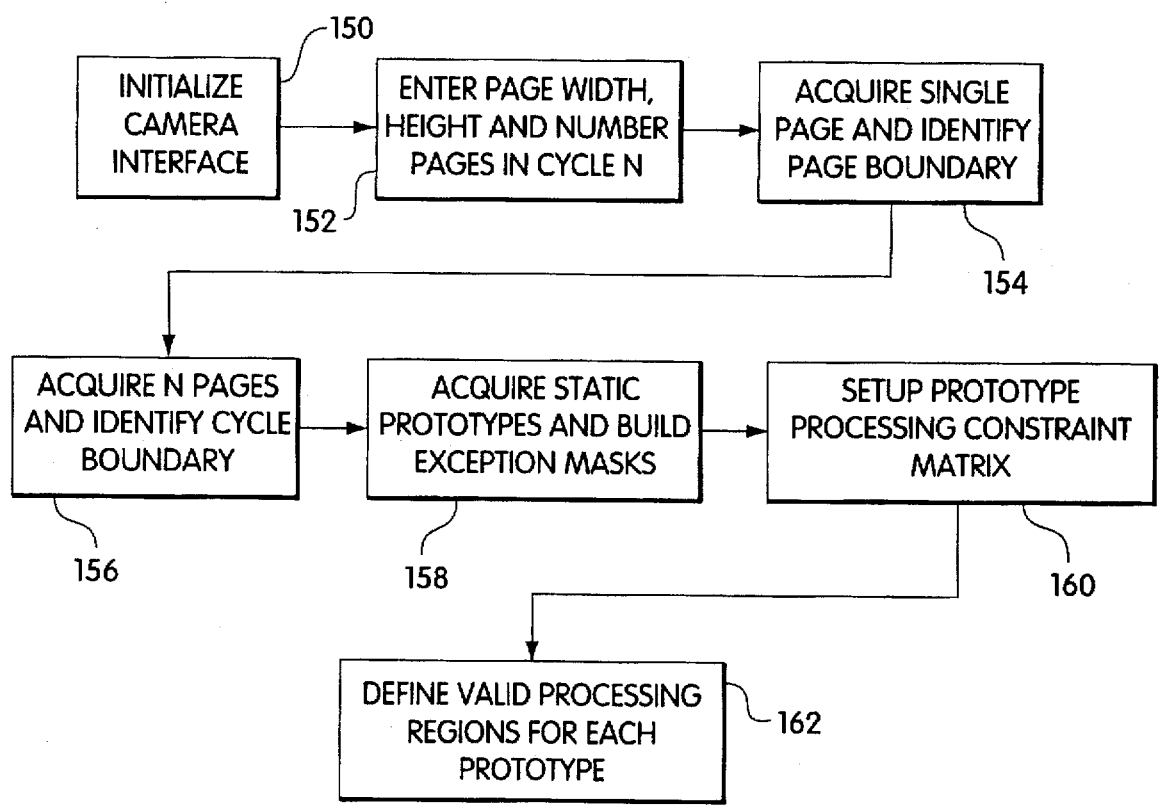
FIG. 12 is a flow diagram of the initialization of the embodiment of FIG. 1.

Referring to FIG. 12, the initialization of the system is now described. After initializing the electronic capture system offset and gain (step 150) as described above, an initial set of parameters describing the current printing task are entered into the system by the operator (step 152). The parameters describe the width and height of a page for the current task, along with the length of the repeat cycle in units of pages.

The repeat cycle refers to the number of different pages in a printed document; for a single page letter the repeat cycle is one, whereas for a three page booklet the repeat cycle is three. Repeat cycles are used to categorize and select subsets of prototypes for processing against test images based on the position of a given test image within the cycle. For example, the first page of printing task with a length of two repeat cycle can be compared with prototypes 1, 2 and 3, and the second page can be compared with prototypes 4 and 5. This allows the system to increase processing efficiency by avoiding comparison of all prototypes against each test image.

The remaining initialization procedures require that the printer be running and printing example data sets that typify the current printing task. Once the configuration parameters are entered and an example print job is running, a single page worth of data is acquired through the imaging system and is presented to the operator for the purposes of defining the top of a page (step 154). The operator defines the position of the top of page by moving an electronic pointing device (e.g., a mouse) to the location in the displayed image corresponding to page break and pressing a selection key (e.g., clicking the mouse button). Defining the top of a page allows the system to synchronize the definition of page boundaries between the print quality control system and the printer.

After page synchronization is achieved, a sequence of pages equal in length to the repeat cycle is captured and displayed one page at a time to the operator for the purposes of identifying the first page in the repeat cycle (step 156). When the first page in the repeat cycle is displayed, the operator simply selects the page. Identifying the first page allows the system to synchronize the definition of batch boundaries for controlling the selection of prototypes during operation. If the length of the repeat cycle is one, batch synchronization is not needed and is not performed.

Once the system is fully synchronized, static prototypes are obtained through the electronic capture system (step 158). The operator obtains a static prototype by selecting the prototype acquisition function from a menu of control options. The operator also specifies the page in the repeat cycle to which the prototype should correspond. The electronic capture system waits an appropriate amount of time, acquires the prototype, and displays the prototype for the operator to review. If the prototype is satisfactory, the operator adds the prototype to the processing set. The addition of the prototype to the set causes the generation of the corresponding exception mask, and the pair are stored in memory. Prototypes and exception mask pairs can also be stored to, and retrieved from, permanent storage (e.g., disk storage).

Although dynamic prototypes are acquired directly from the print engine, preprinted information such as forms or letterhead is handled as a static prototype that is combined electronically with the dynamic prototype. The combined prototype is then used for generating the exception mask, and the combined prototype and exception mask set is used for match processing.

Prototype matching constraints are used for specifying which page in a repeat cycle should be matched against which subset of prototypes from the available set. For matching of an n page repeat cycle against an m page prototype, an n by m processing matrix is presented to the operator. The operator allows or disallows processing of test image i against prototype j by selecting or unselecting position (i,j) in the processing matrix using the electronic pointing device (step 160). The default configuration matches every prototype against each test image in a repeat cycle.

The final state in initializing the system requires defining the valid processing regions for each static prototype (step 162). Prototypes will in general contain some amount of printed information that is not repeatable, such as names and addresses. As non-repeatable information can not be matched using static prototypes, it is necessary to prevent match processing and assessment from occurring in non-repeatable regions. For each prototype, the operator must identify one or more regions where the printed information is repeatable and that match processing can be performed reliably.

The operator identifies valid processing regions by displaying a prototype and drawing rectangular regions around the repeatable print regions using the electronic pointing device. As many regions as necessary can be identified for each prototype. The valid processing region specifications can be saved to, and retrieved from, permanent storage along with the associated prototype and exception mask pairs.

Figure 13:
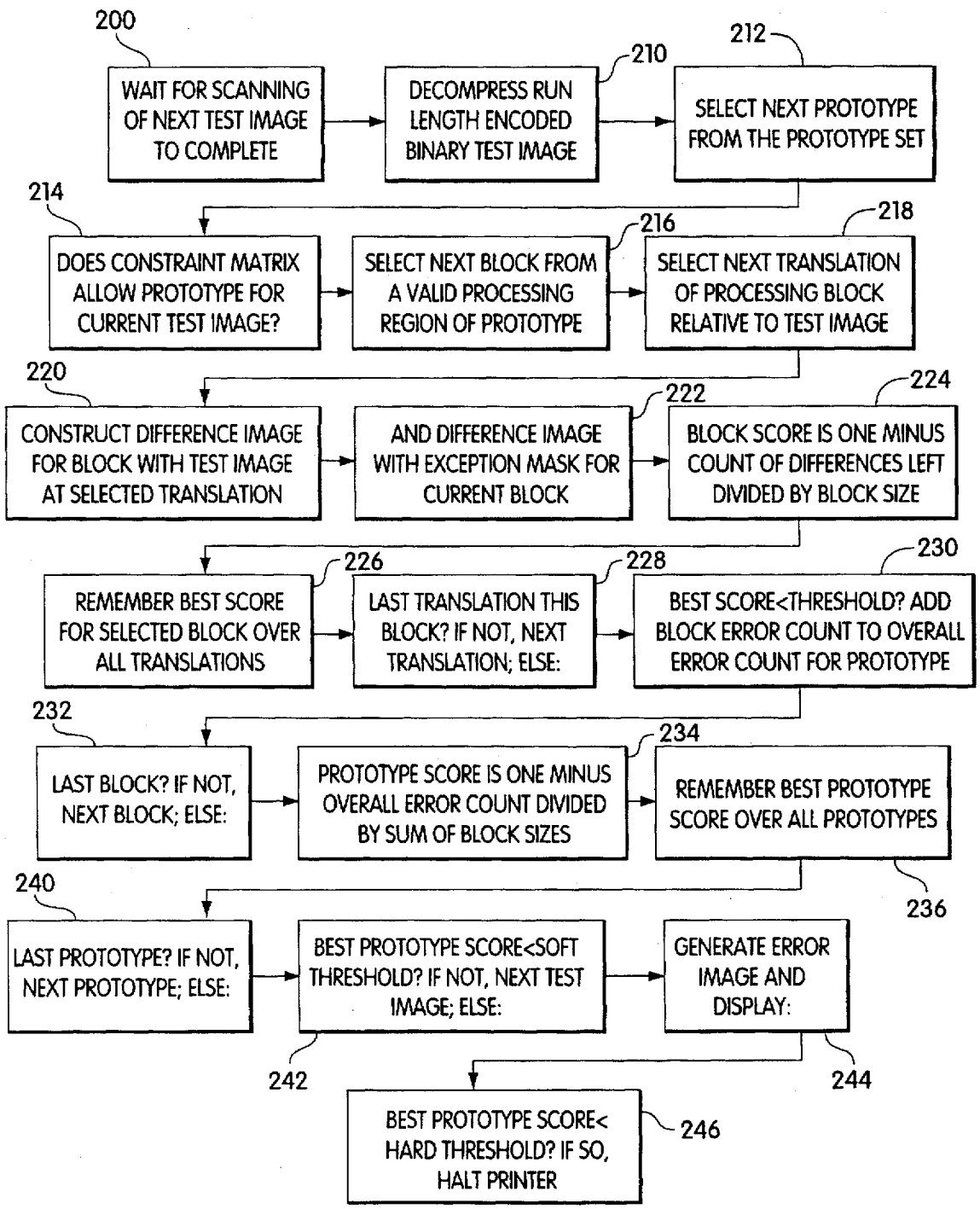
FIG. 13 is a flow diagram illustrating the operation of the embodiment of FIG. 1.

Referring to FIG. 13, the processing flow for the test image acquisition and evaluation cycle is now described.

The cycle starts in an idle loop waiting for the camera interface board interrupt service routine to complete the acquisition of the next complete page of information (step 200). Once a complete data set is available, the data set is decompressed to form the binary test image (step 210). The match process then begins looping over the allowed set of prototypes for the given position of the test image within the repeat cycle as specified by the constraint matrix (step 212–246). The object of the prototype loop is identifying the prototype that best matches the test image. For dynamically acquired prototypes, there is in general only a single prototype used for processing unless several different types of preprinted form are possible.

Within the prototype loop, the system breaks each prototype into a set of 16 pixel by 16 pixel blocks. For each block (or portion of a block) that is within a valid processing region, the system loops over the set of allowed translations of the block with respect to the test image and computes a match score for each translation (step 224). The highest match score over the set of translations becomes the match score for the block (step 226).

For illustration, consider a 16 by 16 block located at position (32,32) in the prototype. In the absence of any imaging artifacts or geometric distortions, the prototype block nominally corresponds to a 16 pixel by 16 pixel region in the test image located at position (32,32). For a translation range of plus or minus 1 pixel in each dimension, the allowed set of translations then has nine elements given by (31,31), (31,32), (31,33),((32,31), (32,32), (32,33), (33,31), (33,32), and (33,33). For each translation in the set, a 16 pixel by 16 pixel difference image is constructed (step 220) as an exclusive OR between the prototype block and a 16 pixel by 16 pixel region located at the given translation. The difference image is then logically ANDed (step 222) with a 16 pixel by 16 pixel exception mask located at position (32,32), and the number of remaining bits set in the resultant image are tallied to produce an error count for the given translation. The error count is then divided by the size of the block and subtracted from 1 to yield the match score for the given translation (step 224). The highest score obtained over all translations is becomes the match score for the block (step 226).

If the match score for the block is less than the block acceptance threshold (step 230), the corresponding error count is added to an overall error count for the prototype. Once all prototype blocks intersecting valid processing regions have been processed (step 232), the overall match score for the prototype is computed by dividing the error count by the sum of the block sizes and subtracting the result from 1 (step 234).

The prototype yielding the highest match score indicates the best match against the test image and the associated match score becomes the match score for the test image (step 236). If the match score for the test image is lower than the soft acceptance threshold (step 242) an error image is generated and presented to the operator (step 244). If the match score for the test image is lower than the hard acceptance threshold, the printing process is shut down (step 246).

Several processing methods can be employed for further speeding up processing. A primary method involves reducing the resolution of the prototype and test imagery. For example, although the image information is acquired at high resolution, the data sets are reduced and comparisons are performed at the lower resolution. As processor speeds and implementation efficiency increases, the resolution used for comparison processing can be increased.

A second method for improving process speed involves specifying regions within the prototypes that are either all white or all black. For these cases, the match function can be greatly simplified by eliminating the explicit use of prototype or exception mask information. For these cases, the double summation term in the match function reduces to counting the number of black pixels when a region should be completely white, or the number of white pixels when the region should be completely black. All-black and all-white regions are identified as special types of valid processing regions during the initialization phase.

Figure 3:
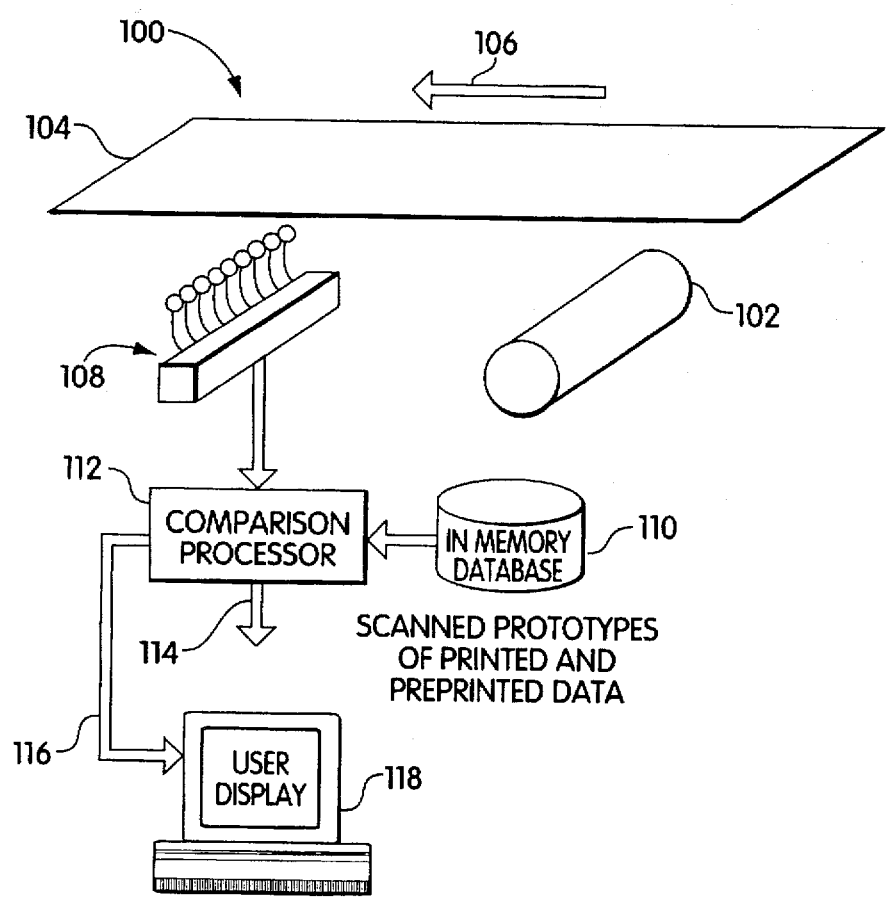
FIG. 3 is a schematic overview diagram for a second embodiment according to the invention.

Referring to FIG. 3, a second embodiment 100 according to the invention includes a print drum 102 of a printer for printing on print stock 104 in a processing direction 106 past an array of sensors 108. The system further includes storage 110 for storing scanned prototypes and a comparison processor 112 responsive to the storage and the sensor array. The comparison processor provides a Go/No Go output 114, which can be used to stop the printer and a display output 116, which may be provided to a user display 118. The second embodiment is similar to the embodiment of FIGS. 1 and 2 but employs a sensor array positioned close to the print stock as a sensing element instead of a camera.

Figure 4:
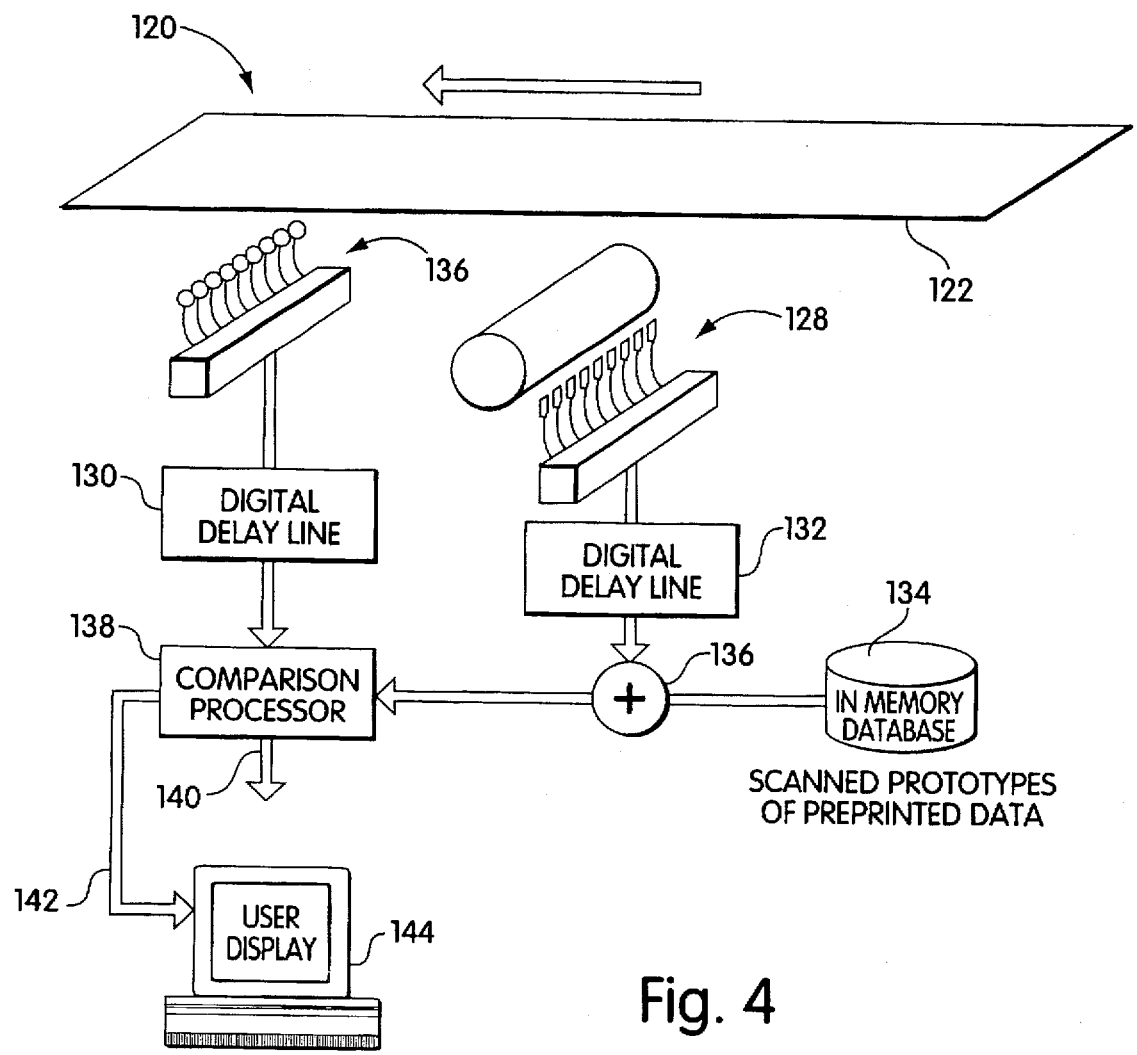
FIG. 4 is a schematic overview diagram of a third embodiment according to the invention.

Referring to FIG. 4, a third embodiment according to the invention includes a print drum 124, which prints on print stock 122. In this embodiment, a first sensor array 126 monitors the print stock after it has been printed, and a second sensor array 128 monitors the image data being transferred to the drum. The output of the first sensor is delayed by a first digital delay line 130 and the output of the second sensor array is delayed by a second digital delay line 132. Scanned prototype storage 134 holds scan prototypes of preprinted information, if any, and provides them to an adder 136, which also receives the output of the second digital delay line. The sum output of the adder is provided to a comparison processor 138 along with the output of the first digital delay line. The comparison processor has a Go/No Go output 140 and a second scan data output 142, which is provided to a processing system 144. This embodiment has the advantage of being able to perform quality assessment of dynamic data (data that can change on a page-by-page basis) as well as static data.

The system described above has been conceived and constructed to address quality control for roll stock, but the system can also be used with sheet stock and fanfolded continuous stock.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A system for controlling print quality of a printed product of a printer, comprising:
    an image acquisition unit for acquiring an electronic test image of printing on said printed product after printing by said printer;
    an image processor for comparing the test image of the printing with a prototype image of desired printing and determining a match between the printing on said test image and the corresponding printing on said prototype image; said image processor including means for performing quality assessment of a printed product that includes any differently ordered sequences of a group of pages that each contain a different arrangement of printed pixels, during printing by said printer; and
    means for generating an alarm representative of a print quality problem when the match between the printing on said test image and the printing on said prototype image does not satisfy a predetermined condition.

2. A system for controlling print quality as defined in claim 1 wherein said image acquisition unit includes means for acquiring a static prototype image from printed product known to be free of defects, system further including storage means for storing said static prototype image for comparison with said test image.

3. A system for controlling print quality as defined in claim 1 wherein said means for performing quality assessment includes means for acquiring, from said printer as said printed product is being printed, a series of dynamic prototype images defining an appearance of said printed product that includes said sequences, each for comparison with a respective one of a series of said test images of printing on said same printed product during printing by said printer.

4. A system for controlling print quality as defined in claim 1 wherein said means for performing quality assessment includes means for determining a match between said test image and two or more different prototype images, and for determining whether the match between any of the two or more prototype images and the same said test image satisfies a predetermined condition, during printing by said printer; and
    wherein the means for generating an alarm representative of a print quality problem includes means for generating an alarm when the match between the printing on said test image and the printing on each of said two or more prototype images do not satisfy a predetermined condition.

5. A system for controlling print quality as defined in claim 1 wherein said image processor includes means for determining a match between said prototype image and said test image by a comparing each of a plurality of overlapping multi-pixel blocks of the prototype image with a different, corresponding set of locally shifted multi-pixel blocks of the test image and evaluating a best match between each of the blocks of the prototype image and the blocks in its corresponding one of the sets.

6. A system for controlling print quality as defined in claim 1 wherein said means for performing quality assessment includes means for acquiring, from the information fed to the printer interface, a series of dynamic prototype images defining an appearance of said printed product that includes said sequence, each for comparison with a respective one of a series of said test images during printing by said printer.

7. A system for controlling print quality as defined in claim 5 wherein the image processor is further for forcing coverage of the entire test image with said blocks.

8. A method for controlling print quality of a printed product of a printer, comprising the steps of:
    acquiring an electronic prototype image of desired printing on said printed product, wherein the step of acquiring a prototype image includes acquiring, from said printer as said printed product is being printed, a dynamic prototype image defining an appearance of said printed product for comparison with said test image during printing by said printer;
    acquiring an electronic test image of actual printing on said printed product after printing by said printer;
    electronically comparing said test image with said dynamic prototype image and determining a match between the printing on said test image and the printing on said dynamic prototype image;
    generating an alarm representative of a print quality problem when the match between the printing on said image and the printing on said dynamic prototype image does not satisfy a predetermined condition; and dynamically generating an exception mask from the dynamic prototype image acquired in the step of acquiring, said exception mask defining transition regions of said prototype image, and further including the step of ignoring mismatches in said transition regions of said prototype image defined by said exception mask.

9. A system for controlling print quality of a printed product of a printer, comprising:

an image acquisition unit for acquiring an electronic test image of printing on said printed product after printing by said printer;

an image processor for comparing the test image of the printing with a prototype image of desired printing and determining a match between the printing on said test image and the printing on said prototype image by comparing each of a plurality of overlapping multi-pixel blocks of the prototype image with a different, corresponding set of locally shifted multi-pixel blocks of the test image and evaluating a best match between each of the blocks of the prototype image and the blocks in its corresponding one of the sets; and means for generating an alarm representative of a print quality problem when the best match between one of the blocks of said test image and one of the blocks of said prototype image does not satisfy a predetermined condition.

10. The system of claim 9 wherein the means for assessing an overall match includes means for performing scaled, normalized inner products for each of the overlapping blocks.

11. The system of claim 9 wherein the means for assessing an overall match includes means for reusing results from a first of said blocks to assess areas of a second of said blocks, which areas overlap the first of said blocks.

12. The system of claim 9 wherein the means for assessing an overall match includes means for assessing blocks that overlap in two dimensions.

13. The system of claim 9 wherein the means for assessing an overall match includes means for assessing blocks that overlap to cover each pixel position in the test image.

14. A system for controlling print quality as defined in claim 9 wherein the image processor is further for forcing coverage of the entire test image with said blocks.

15. A system for controlling print quality of a printed product of a printer, comprising:

an image acquisition unit for acquiring an electronic test image of printing on said printed product after printing by said printer;

an image processor for comparing the test image of the printing with one prototype image of desired printing and determining a match between the printing on said test image and the printing on said one prototype image, said image processor comprising:

means for generating, from said one prototype image alone and using morphological filtering operations, an exception mask corresponding to said prototype image, said exception mask defining transition regions of said prototype image; and means for ignoring mismatches in said transition regions of said prototype image defined by said exception mask; and means for generating an alarm representative of a print quality problem when the match between the printing on said test image and the printing on said prototype image does not satisfy a predetermined condition.

16. The system of claim 15 wherein the means for generating an exception mask includes means for generating the exception mask from the one prototype image alone using the morphological filtering operations to define the exception mask as a logical OR operation between 1) a morphological dilation of the prototype image and a square structuring element and 2) a morphological erosion of the prototype image and the same square structuring element.

* * * * *